United States Patent [19]

Conroy et al.

[11] 4,202,667
[45] May 13, 1980

[54] PROCESS FOR THE SEPARATION OF INSOLUBLE MATERIALS IN THE PRODUCTION OF SODA ASH

[75] Inventors: Edward H. Conroy, Green River, Wyo.; Arthur Gloster, New York, N.Y.; James A. King, Green River, Wyo.

[73] Assignee: Texasgulf Inc., Stamford, Conn.

[21] Appl. No.: 934,020

[22] Filed: Aug. 16, 1978

Related U.S. Application Data

[63] Continuation of Ser. No. 835,697, Sep. 20, 1977, abandoned.

[51] Int. Cl.² .............................................. B01D 9/02
[52] U.S. Cl. .............................. 23/302 T; 423/206 T
[58] Field of Search ................. 23/302 T; 423/206 T; 210/167, 223

[56] References Cited

U.S. PATENT DOCUMENTS

| | | | |
|---|---|---|---|
| 3,479,134 | 11/1969 | Warzel | 423/206 T |
| 3,840,120 | 10/1974 | Greenberg | 210/167 |
| 4,021,527 | 5/1977 | Baadsguard | 23/302 T |

OTHER PUBLICATIONS

Trawinski, E & MJ, Sep., 1976, pp. 115-127.

*Primary Examiner*—Hiram H. Bernstein
*Attorney, Agent, or Firm*—Kenyon & Kenyon

[57] ABSTRACT

An improved process for the production of soda ash from trona including the steps of sizing the trona, heating the trona to eliminate water and carbon dioxide therefrom, dissolving the trona in an aqueous medium to obtain a solution thereof, removing insoluble solid materials from the solution, crystallizing sodium carbonate monohydrate from the solution, and heating the crystallized sodium carbonate monohydrate to produce soda ash. The improvement of the invention comprises the step of removing insoluble solid materials from the solution of trona by classifying the insoluble solid materials in a plurality of hydroclones.

4 Claims, 1 Drawing Figure

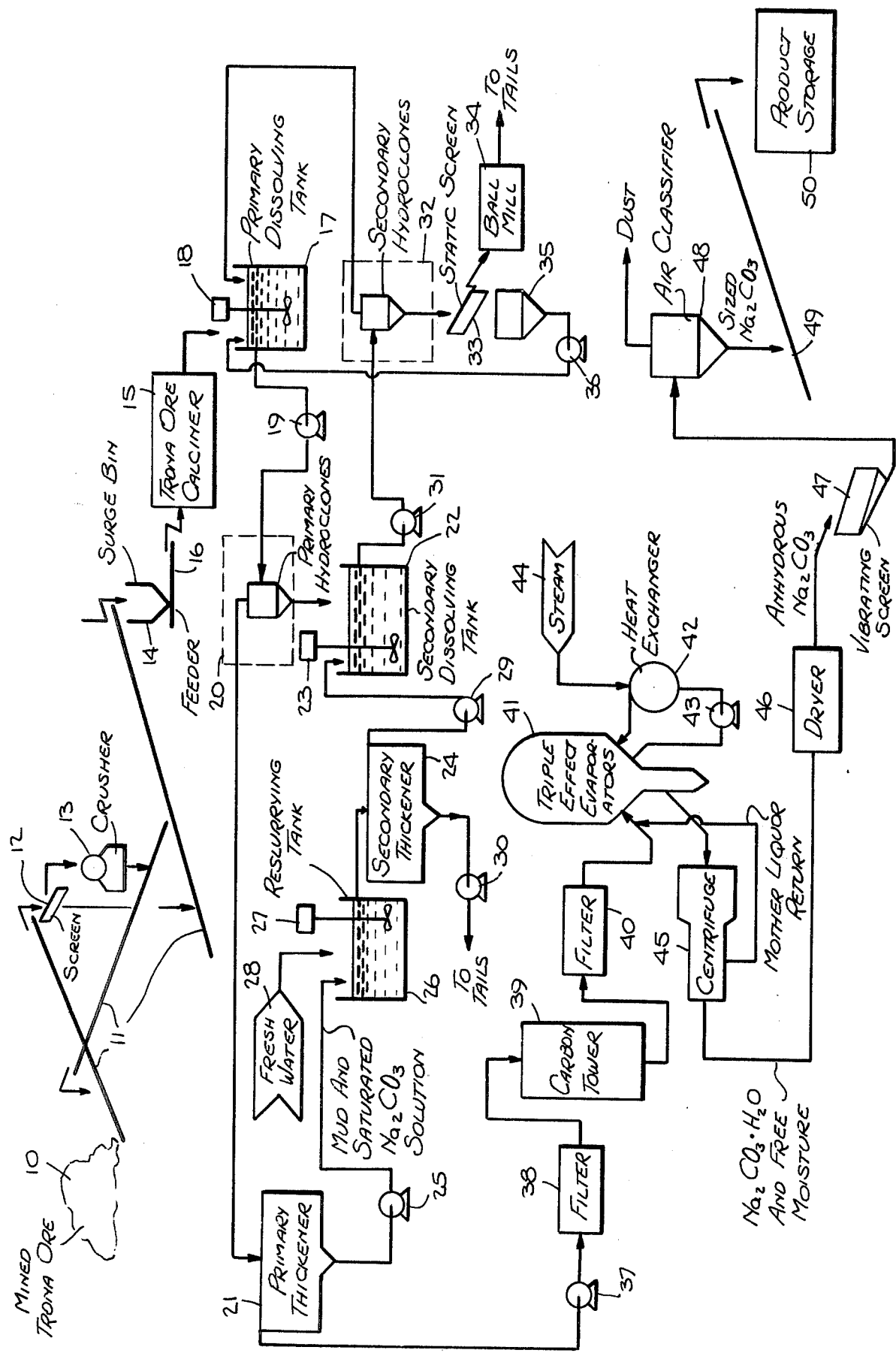

PROCESS FOR THE SEPARATION OF INSOLUBLE MATERIALS IN THE PRODUCTION OF SODA ASH

This is a continuation of application Ser. No. 835,697 filed Sept. 20, 1977 and now abandoned.

BACKGROUND OF THE INVENTION

1. Field of the Invention

The present invention relates generally to an improved process for the separation of insoluble solid materials from slurry resulting from the dissolution of calcined trona ore in water or unsaturated aqueous sodium carbonate solution in the production of soda ash.

2. Description of the Prior Art

Trona is a naturally-occurring material found in abundance in Sweetwater County, Wyoming. It is extracted from seams lying 800 to 1800 feet underground using well-established mining techniques. Trona consists of sodium sesquicarbonate ($NaHCO_3.Na_2CO_3.2H_2O$), insoluble sand, shale, etc., and free moisture. The approximate percentages of these constituents in trona is as follows:

| | |
|---|---|
| Sodium sesquicarbonate | 85–92% |
| Insolubles | 6–13% |
| Water | 0.5–3.0% |

Trona is used in the manufacture of soda ash ($Na_2CO_3$). It is essential that manufactured soda ash be free of insoluble materials because the presence of such materials is highly objectionable to soda ash users.

In the production of soda ash from natural trona ore, two methods are most prevalent in the industry. In one of these methods, known as the "monohydrate" process, trona ore is first heated to expel water and carbon dioxide to produce an impure soda ash. The sodium carbonate values of this soda ash are then dissolved in an aqueous medium from which insoluble impurities are removed. Sodium carbonate monohydrate is then crystallized from the purified solution and these crystals are then heated to remove water and produce soda ash.

More specifically, the first step in manufacturing soda ash by the monohydrate process after the trona ore has been reduced to the proper size, i.e., minus one-quarter ($-\frac{1}{4}$) inch, is to heat the trona ore in a calciner so that the following reaction takes place:

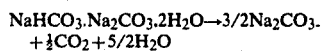
$$NaHCO_3.Na_2CO_3.2H_2O \rightarrow 3/2 Na_2CO_3 + \tfrac{1}{2}CO_2 + 5/2 H_2O$$

The heated ore produced by this reaction consists of soda ash, $Na_2CO_3$, and insoluble material. This ore is then mixed with water or unsaturated sodium carbonate solution to form a slurry comprising aqueous sodium carbonate in the liquid phase and insoluble gangue and some undissolved soda ash in the solid phase. The foregoing process steps are well-known and established practice in the industry.

The objective of the next series of operations in the manufacture of soda ash is to produce a solution which is completely free of insoluble materials. This solids-free liquid is then fed to crystallizers in which sodium carbonate monohydrate crystals ($Na_2CO_3.H_2O$) are produced. These crystals are then deliquored in a centrifuge, are dried to remove free moisture and water of hydration in a dryer, are sized by well-known methods, for example, by means of a vibrating screen and air classifier, and are thus converted into saleable anhydrous sodium carbonate. Users of this latter material require that the soda ash be at least 99.5% $Na_2CO_3$ and contain, for all practical purposes, no insoluble material. Thus, solids removal from the precursor solution prior to the crystallization step in the production process is essential.

The first step in the solids removal operation is to form from the initial slurry of insolubles and undissolved sodium carbonate, which is produced when the calcined trona ore is mixed with water or unsaturated sodium carbonate solution, two slurries one of which contains the bulk of the larger, coarser particles, i.e., those coarser than about 70 mesh, and the other of which contains the bulk of the finer particles. The accepted practice in the industry is to separate coarser insolubles, those having a size of approximately plus (+) 70 mesh, minus one-quarter ($-\frac{1}{4}$ inch, from the finer insoluble materials by means of a spiral or screw classifier with either water or a weak soda ash solution. The coarse insolubles are separated from the resultant solution, again by means of a screw or spiral classifier, and are then discarded. The weak solution is then returned to the process to be brought up to full saturation, i.e., approximately 30% $Na_2CO_3$ and 70% $H_2O$, by mixing the solution with calcined trona ore. The finer solids and the saturated solution then proceed to subsequent settling and filtration operations which remove substantially all of the remaining solids.

Although the separation of the insoluble materials as described above is adequately achieved by using a screw or spiral classifier, such classifiers provide only limited flexibility over the management of the solids separation during the production of soda ash. Spiral classifiers and rake classifiers are single units which are used for a single separation operation in present methods of producing soda ash from trona. These classifiers do not provide the versatility of coping with fluctuations in feed rate, feed slurry solids content, or solids size distribution. The foregoing three parameter variations are experienced in day-to-day manufacturing of soda ash due to the fluctuations in soda ash demand, variation in insoluble content of the mined trona, and in size distribution of the trona ore.

SUMMARY OF THE INVENTION

It is therefore an object of the present invention to provide an improved process for the production of soda ash from trona which overcomes the aforementioned disadvantages of heretofore known processes for the production of soda ash.

It is also an object of the present invention to provide an improved process for the production of soda ash from trona which permits greater flexibility over the management of solids separation from the calcined trona ore solution during production of the soda ash.

These and other objects of the invention are achieved in a process for the production of soda ash from trona including the steps of sizing the trona, heating the trona to eliminate water and carbon dioxide therefrom, dissolving the trona in an aqueous medium to obtain a solution thereof, removing insoluble solid materials from the solution, crystallizing sodium carbonate monohydrate from the solution, and heating the crystallized sodium carbonate monohydrate to produce soda ash.

The improvement comprises the step of removing comprising removing insoluble solid materials from the solution by classifying the insoluble solid materials in a plurality of hydroclones.

In one embodiment of the invention the step of classifying the insoluble solid materials comprises separating coarse solids from fine solids of the insoluble solid materials in the plurality of hydroclones. In another embodiment, the step of removing further comprises the step of separating the separated fine solids of the insoluble solid materials from the solution to produce a clarified solution of the heated trona and the steps of dissolving the separated coarse solids in an aqueous medium to obtain a solution thereof and further classifying the separated coarse solids to remove insoluble solid materials from the solution thereof.

The foregoing step of further classifying the separated coarse solids may comprise separating coarse insoluble materials from fine insoluble materials in the solution of the separated coarse solids in a plurality of additional hydroclones. In accordance with this embodiment of the invention, the step of dissolving the trona may comprise dissolving the trona and the fine insoluble materials separated from the solution of the separated coarse solids in an aqueous medium to obtain a solution thereof.

In a further embodiment of the invention, the step of further classifying the separated coarse solids further comprises the step of sizing the separated coarse insoluble materials, and the step of dissolving the trona comprises dissolving the sized coarse insoluble materials, the trona, and the fine insoluble materials separated from the solution of the separated coarse solids in an aqueous medium to obtain a solution thereof.

The process according to the invention utilizes hydroclones, i.e., hydrocyclones, instead of spiral classifiers or rake-type classifiers to effect separation of the fine and coarse solids in solution. Such hydroclones have heretofore been used for classification purposes. See, for example, U.S. Pat. No. 2,984,348 issued May 16, 1961 for "Beneficiation of Potash Ores"; U.S. Pat. No. 2,746,604 issued May 22, 1956 for "Process of Classifying Granular Mixtures"; U.S. Pat. No. 2,708,517 issued May 17, 1955 for "Hydraulic Classification of Solids"; Canadian Pat. No. 537,863 issued Mar. 5, 1957 for "Beneficiation of Soluble Ores"; and *Engineering and Mining Journal*, Vol. 153, No. 2 (February, 1952), pp. 128–130. Such hydroclones, however, have not been used for classification in the production of soda ash. The advantage provided by the separation of the solids using hydroclones in the production of soda ash is that when manifolded together in any number greater than one, the hydroclones permit the operator controlling the soda ash production process greater flexibility over management of the solids separation step in the process. Specifically, the multiplicity of cyclones utilized, and the added options of varying either or both of the two easily-changed cyclone components, namely, apex size and vortex finder, permit the operator the capability of adjusting the separation system to account for variations in insoluble content in the ore, in insoluble particle size, and in system feed rate.

These and other novel features and advantages of the inventive process will be described in greater detail in the following detailed description.

BRIEF DESCRIPTION OF THE DRAWING

The drawing is a flow diagram of an improved process for the production of soda ash from trona according to the present invention.

DETAILED DESCRIPTION

Referring now to the drawing, in accordance with the invention, crude trona ore, generally identified by reference numeral 10, is prepared for calcination or heating by conveying the trona ore on a series of conveyors 11 to a screen 12 and a crusher 13 to obtain desired particle sizes, specifically, minus one-quarter ($-\frac{1}{4}$) inch. The crushed, sized trona is then conveyed to a surge bin 14 and from the surge bin to a calciner 15 by means of a feeder 16. The crushed, sized trona is then calcined to eliminate water and carbon dioxide according to the following reaction:

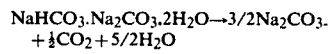

$$NaHCO_3 \cdot Na_2CO_3 \cdot 2H_2O \rightarrow 3/2 Na_2CO_3 + \tfrac{1}{2}CO_2 + 5/2 H_2O$$

Calcination is preferably carried out at temperatures between 150° C. and about 800° C., preferably about 200° C. Temperatures above about 800° C. should be avoided since impure sodium carbonate begins to sinter or fuse at such temperatures. Any suitable calciner, such as a vertical kiln or a rotary, direct-fired calciner may be employed. Typical calcination lasts from about ten to about forty minutes at the foregoing temperatures, the longer calcination times corresponding to the lower temperatures.

The calcined trona ore, which now consists of soda ash and insoluble material, is dissolved in an aqueous medium such as water or sodium carbonate solution, rinses or washes recovered from the soda ash process, in a primary dissolving tank 17. This dissolving tank includes an agitator 18 and forms a slurry comprising aqueous sodium carbonate in the liquid phase and insoluble gangue and some undissolved soda ash in the solid phase. Dissolution is continued in the primary dissolving tank to produce a substantially saturated solution of sodium carbonate from the weak sodium carbonate solution at temperatures in the range of about 80° to 110° C. Typically the sodium carbonate content of the resulting solution is between about 20% to 33% sodium carbonate by weight. The slurry produced in dissolving tank 17 is pumped by means of a pump 19 to a plurality of primary hydroclones 20 which separate the coarse and fine insoluble materials in the slurry. The overflow from the hydroclones consists of saturated solution and the fines portion of the insoluble solid materials and flows into a primary thickener 21 in which insoluble solid materials are removed by sedimentation.

The coarse solids separated from the slurry by hydroclones 20 are passed to a secondary dissolving tank 22 including an agitator 23 for further leaching utilizing a weak sodium carbonate solution from a secondary thickener 24. A pump 25 pumps the underflow from primary thickener 21, which consists of mud and saturated sodium carbonate solution, to a reslurrying tank 26 which includes an agitator 27. Fresh water is added to the reslurrying tank from a fresh water supply 28 and the resulting slurry is passed to secondary thickener 24. The weak sodium carbonate solution is pumped from the secondary thickener to the secondary dissolving tank by means of a pump 29 and the underflow from the secondary thickener is pumped by a pump 30 to a tailings pond. It should be noted that although a weak sodium carbonate solution is utilized as the solvent in the secondary dissolving tank, water may also be used as the solvent.

The slurry produced in secondary dissolving tank 22 is pumped therefrom by another pump 31 to a plurality of secondary hydroclones 32 which classify the insoluble materials in the slurry and separate the fine insoluble materials from the coarse insoluble materials in the slurry of the coarse solids separated by primary hydroclones 20 and dissolved in secondary dissolving tank 22. The weak soda ash solution and the fines overflowing from the hydroclones 32 pass up into primary dissolving tank 17 and are used to produce the saturated sodium carbonate solution used for dissolution of the calcined trona ore. The underflow from the secondary hydroclones 32 consists of the coarse solids separated from the slurry produced by secondary dissolving tank 22 and some liquid which are passed over a static screen 33 for size separation. The coarser solids which do not pass through static screen 33 flow into a feed chute for a ball mill 34 which comminutes the coarse solids to facilitate pumping thereof to a tailings pond. A pump tank 35 is disposed below the static screen for collecting the underflow from secondary hydroclones 32 passing through the screen. A pump 36 coupled to the pump tank pumps the underflow collected in the tank back to primary dissolving tank 17. This underflow is used to produce the saturated sodium carbonate solution in the primary dissolving tank.

The overflow of primary thickener 21 is a clarified sodium carbonate solution. This solution is pumped by means of a pump 37 through a first filter 38, a carbon tower 39 and a second filter 40 to remove any remaining insoluble materials in the solution. The solution is then crystallized in a series of triple-effect evaporators 41, i.e., a set of forced circulation evaporators, to produce sodium carbonate monohydrate crystals ($Na_2CO_3 \cdot H_2O$). The crystal slurry in the evaporators is pumped from the evaporators through a steam-heated exchanger 42 by means of a circulation pump 43 and then back to the evaporators. Steam is supplied to the heat exchanger from a steam supply 44. The crystal slurry is passed from the evaporators to a centrifuge 45 which deliquors the crystals. The separated mother liquor is fed back to the triple-effect evaporators and the centrifuge cake, which consists of sodium carbonate monohydrate crystals and free moisture, is conveyed to a dryer 46 to remove free and combined water and yield pure anhydrous sodium carbonate, which is soda ash. The soda ash thus produced is sized by a vibrating screen 47 and an air classifier 48. The overflow produced by the air classifier is dust and the underflow produced by the classifier is sized sodium carbonate. This sized sodium carbonate is conveyed by means of a conveyor 49 to a soda ash product storage 50.

The data presented below exemplifies the nature of the size separation achieved by the primary and secondary hydroclones in the manner described.

| Primary Hydroclone Separation | | | | | |
|---|---|---|---|---|---|
| Inlet % Solid 6-14% | | Overflow % Solid 2.5-3.5% | | Underflow % Solid 15-25% | |
| Feed | | Overflow | | Underflow | |
|  |  | Size Distribution | |  |  |
| +20 | 42.4 | 40 | 1.5 | 20 | 43.2 |
| +30 | 4.6 | 70 | 6.0 | 30 | 9.4 |
| +40 | 4.6 | 100 | 9.0 | 40 | 9.9 |
| +50 | 6.0 | 200 | 24.1 | 50 | 7.4 |
| +70 | 5.0 | −200 | 59.4 | 70 | 5.8 |
| −70 | 39.2 |  |  | 100 | 6.4 |
|  |  |  |  | 200 | 8.9 |
|  |  |  |  | −200 | 8.9 |

| Secondary Hydroclone Separation | | | | | |
|---|---|---|---|---|---|
| Inlet % Solids 6-14% | | Overflow % Solids 2.5-3.5% | | Underflow % Solids 15-15% | |
| Feed | | Size Distribution Overflow | | Underflow | |
| +20 | 22.8 | +40 | 8.7 | +20 | 48.1 |
| +30 | 8.7 | +70 | 8.7 | +30 | 5.85 |
| +40 | 8.7 | +100 | 4.3 | +40 | 4.66 |
| +50 | 19.6 | +200 | 13.1 | +50 | 6.91 |
| +70 | 21.7 | −200 | 65.2 | +70 | 18.5 |
| −70 | 18.5 |  |  | +100 | 6.40 |
|  |  |  |  | +200 | 8.22 |
|  |  |  |  | −200 | 1.31 |

The relationship of the primary and secondary separations as it relates to the soda ash process is depicted in the drawing.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a process for the production of soda ash from trona by the normal monohydrate process including the steps of calcining said trona to form a mixture of sodium carbonate and insoluble impurities, forming an initial aqueous solution of said carbonate containing a slurry of said impurities, separating said impurities from said sodium carbonate solution to form a purified solution, crystallizing sodium carbonate monohydrate from said purified solution and drying such crystals to form soda ash, the improvement comprising subjecting said initial solution to a first hydrocyclone separation step to provide a first overflow containing dissolved sodium carbonate and relatively fine insoluble impurities and a first underflow containing dissolved sodium carbonate and relatively coarse insoluble impurities, subjecting said first overflow successively to thickening, filtration, color removal, filtration, crystallization and drying steps to provide a soda ash product, and adding said first underflow to an aqueous medium to form a second slurry and then subjecting said second slurry to a second hydrocyclone separation step to provide a second overflow and a second underflow, recycling said second overflow to said initial aqueous solution, and subjecting said second underflow to a screening step to provide a screen oversize fraction which is discarded and a screen undersize which is recycled to said initial aqueous solution.

2. In the process of claim 1, said initial solution having a percent solids content of about 6 to 14 and a mesh size distribution of insolubles predominantly about +20 and about −70 mesh, said first hydrocyclone separation step providing an overflow having about 2.5 to 3.5 percent solids and predominantly about 200 mesh insolubles, and an underflow having about 15 to 25% solids and predominantly about +50 mesh insolubles, said second hydrocyclone separation step providing an overflow having about 2.5 to 3.5 percent solids and predominantly about 200 mesh insolubles, and an underflow having about 15–25% solids and predominantly about +70 mesh insolubles.

3. In the process of claim 2, said screen oversize being subjected to size reduction prior to being discarded.

4. In the process of claim 2, said first and second hydrocyclone separation steps each comprised of at least two hydrocyclones in series.

* * * * *